US012680272B2

(12) United States Patent
Sonoda et al.

(10) Patent No.: US 12,680,272 B2
(45) Date of Patent: Jul. 14, 2026

(54) WORK MACHINE AND METHOD FOR CONTROLLING WORK MACHINE

(71) Applicant: KOMATSU LTD., Tokyo (JP)

(72) Inventors: Takuya Sonoda, Tokyo (JP); Takashi Maeda, Tokyo (JP); Yoshihide Nakae, Tokyo (JP)

(73) Assignee: KOMATSU LTD., Tokyo (JP)

( * ) Notice: Subject to any disclaimer, the term of this patent is extended or adjusted under 35 U.S.C. 154(b) by 392 days.

(21) Appl. No.: 18/558,219

(22) PCT Filed: May 18, 2022

(86) PCT No.: PCT/JP2022/020664
§ 371 (c)(1),
(2) Date: Oct. 31, 2023

(87) PCT Pub. No.: WO2023/286444

PCT Pub. Date: Jan. 19, 2023

(65) Prior Publication Data

US 2024/0218634 A1 Jul. 4, 2024

(30) Foreign Application Priority Data

Jul. 16, 2021 (JP) ................................. 2021-117772

(51) Int. Cl.
*E02F 9/22* (2006.01)
*B62D 1/22* (2006.01)
(Continued)

(52) U.S. Cl.
CPC ............... *E02F 9/225* (2013.01); *B62D 1/22* (2013.01); *B62D 5/091* (2013.01); *E02F 9/2004* (2013.01);
(Continued)

(58) Field of Classification Search
CPC ....... E02F 9/225; E02F 9/2004; E02F 9/2203; E02F 9/2285; E02F 9/2292; B62D 1/22; B62D 5/091
See application file for complete search history.

(56) References Cited

U.S. PATENT DOCUMENTS 5,923,096 A * 7/1999 Manak ................... B60L 50/52
701/41
9,371,898 B2 * 6/2016 Schulte .................. F16H 61/46
(Continued)

FOREIGN PATENT DOCUMENTS

CN 101959741 A 1/2011
CN 102015417 A 4/2011
(Continued)

OTHER PUBLICATIONS

The International Search Report for the corresponding international application No. PCT/JP2022/020664, issued on Jul. 19, 2022.
(Continued)

*Primary Examiner* — Valentin Neacsu
*Assistant Examiner* — Michael R Stabley
(74) *Attorney, Agent, or Firm* — Spencer Fane LLP

(57) ABSTRACT

A work machine includes a vehicle body, a traveling wheel supported by the vehicle body, an actuator to change a steering angle of the traveling wheel from a neutral angle to left or right, a first steering member, and a controller. The first steering member is operable between a left steering range, a right steering range, and a neutral range. The controller controls the actuator so that the steering angle of the traveling wheel is changed to the left and right at speeds that correspond to operating amounts of the first steering member when the first steering member is positioned in the left and right steering ranges, respectively. The controller controls the actuator so that the steering angle returns to the
(Continued)

neutral angle when the first steering member is positioned in the neutral range.

8 Claims, 8 Drawing Sheets

(51) Int. Cl.
B62D 5/09 (2006.01)
E02F 9/20 (2006.01)
(52) U.S. Cl.
CPC ........... *E02F 9/2203* (2013.01); *E02F 9/2285* (2013.01); *E02F 9/2292* (2013.01)

(56) References Cited

U.S. PATENT DOCUMENTS

| | | | | |
|---|---|---|---|---|
| 9,556,589 | B2 * | 1/2017 | Brooks | E02F 3/405 |
| 10,384,713 | B2 * | 8/2019 | Takenaka | B62D 12/00 |
| 10,518,803 | B2 * | 12/2019 | Takenaka | B62D 1/12 |
| 10,730,549 | B2 * | 8/2020 | Takenaka | B62D 6/02 |
| 2002/0005302 | A1 | 1/2002 | Hidaka | |
| 2009/0007556 | A1 | 1/2009 | Djurovic et al. | |
| 2012/0217083 | A1 * | 8/2012 | Brickner | B62D 12/00 |
| | | | | 180/443 |
| 2014/0174066 | A1 * | 6/2014 | Schulte | F16H 39/14 |
| | | | | 60/464 |
| 2014/0343697 | A1 * | 11/2014 | Kuipers | B60W 50/16 |
| | | | | 700/83 |
| 2014/0343804 | A1 * | 11/2014 | Brooks | E02F 3/405 |
| | | | | 701/50 |
| 2018/0037255 | A1 * | 2/2018 | Takenaka | B62D 1/12 |
| 2018/0105203 | A1 * | 4/2018 | Takenaka | B62D 5/09 |
| 2018/0105205 | A1 * | 4/2018 | Takenaka | B62D 6/02 |
| 2022/0298749 | A1 | 9/2022 | Sonoda et al. | |

FOREIGN PATENT DOCUMENTS

| | | |
|---|---|---|
| CN | 112236563 A | 1/2021 |
| JP | 2000-175547 A | 6/2000 |
| JP | 2003-175854 A | 6/2003 |
| JP | 2007-38830 A | 2/2007 |
| JP | 2017-87779 A | 5/2017 |
| JP | 2021-54270 A | 4/2021 |

OTHER PUBLICATIONS

First Office Action for the corresponding Chinese Patent Application No. 202280029253.4; Issued Jan. 16, 2026.

* cited by examiner

WORK MACHINE AND METHOD FOR CONTROLLING WORK MACHINE

CROSS-REFERENCE TO RELATED APPLICATIONS

This application is a U.S. National stage application of International Application No. PCT/JP2022/020664, filed on May 18, 2022. This U.S. National stage application claims priority under 35 U.S.C. § 119(a) to Japanese Patent Application No. 2021-117772, filed in Japan on Jul. 16, 2021, the entire contents of which are hereby incorporated herein by reference.

BACKGROUND

Field of the Invention

The present invention relates to a work machine and a method for controlling the work machine.

Background Information

A work machine is provided with a steering member such as a steering wheel or a steering lever for steering traveling wheels to the left or right. The operator of the work machine operates the steering member whereby the work machine changes the steering angle of the traveling wheels to the left or right. Consequently, the work machine turns to the left or right.

Position control and speed control exist as control types for controlling the steering angle by means of the operation of the steering member. In the position control type, the steering angle is set to an angle that corresponds to the operating amount of the steering member. On the other hand, in the speed control type, the steering angle changes at a speed corresponding to the operating amount of the steering member as described in Japanese Patent Laid-open No. 2021-054270 For example, when the steering member is operated at a predetermined operating amount from a neutral position to the left or right, the steering angle changes at the speed corresponding to the predetermined operating amount. Therefore, even if the operator is holding the steering member at the predetermined operating amount, the steering angle continues to change to the left or right until a maximum steering angle is reached.

SUMMARY

In the abovementioned position control type, the operator returns the steering member to the neutral position thereby causing the work machine to travel straight. However, it is not easy to smoothly perform a very small steering angle operation. On the other hand, in the speed control type, the feature of smoothly performing a very small steering angle operation is an advantage. However, in order to cause the work machine to travel straight after turning to the left or right, the operator must operate the steering member in the opposite direction to return the steering angle to the straight direction. As a result the operations for enabling the work machine to turn and travel straight are not easy and require skilled experience. An object of the present invention is to provide a work machine with which an operation for performing a very small turn can be performed smoothly and operations for turning and traveling straight are easy.

A work machine according to a first aspect of the present invention comprises a vehicle body, a traveling wheel, an actuator, a first steering member, and a controller. The traveling wheel is supported by the vehicle body. The actuator changes the steering angle of the traveling wheel from a neutral angle to the left or right. The first steering member is operable between a left steering range, a right steering range, and a neutral range. The neutral range is a position between the left steering range and the right steering range. The controller controls the actuator so that the steering angle of the traveling wheel is changed to the left at a speed that corresponds to an operating amount of the first steering member when the first steering member is positioned in the left steering range. The controller controls the actuator so that the steering angle of the traveling wheel is changed to the right at a speed that corresponds to an operating amount of the first steering member when the first steering member is positioned in the right steering range. The controller controls the actuator so that the steering angle returns to the neutral angle when the first steering member is positioned in the neutral range.

A method according to a second aspect of the present invention is a method for controlling a work machine. The work machine comprises a vehicle body, a traveling wheel, and an actuator. The traveling wheel is supported by the vehicle body. The actuator changes the steering angle of the traveling wheel from a neutral angle to the left or right. The method according to the present aspect comprises: acquiring a signal indicating an operating amount of a first steering member that is operable in a left steering range, a right steering range, and a neutral range that is between the left steering range and the right steering range; controlling the actuator so as to change the steering angle of the traveling wheel to the left at a speed corresponding to the operating amount of the first steering member when the first steering member is positioned in the left steering range; controlling the actuator so as to change the steering angle of the traveling wheel to the right at a speed corresponding to the operating amount of the first steering member when the first steering member is positioned in the right steering range; and controlling the actuator so as to return the steering angle to the neutral angle when the first steering member is positioned in the neutral range.

According to the present invention, the steering angle is controlled in a speed control type when the first steering member is operated in the left steering range or the right steering range. Consequently, an operation of a very small steering angle can be performed smoothly. In addition, when the first steering member is positioned in the neutral range, the steering angle is returned to the neutral angle. As a result, the operator is able to return the first steering member to the neutral range after turning the work machine, and thereby is able to cause the work machine to travel straight easily.

DETAILED DESCRIPTION OF EMBODIMENT(S)

Figure 1:
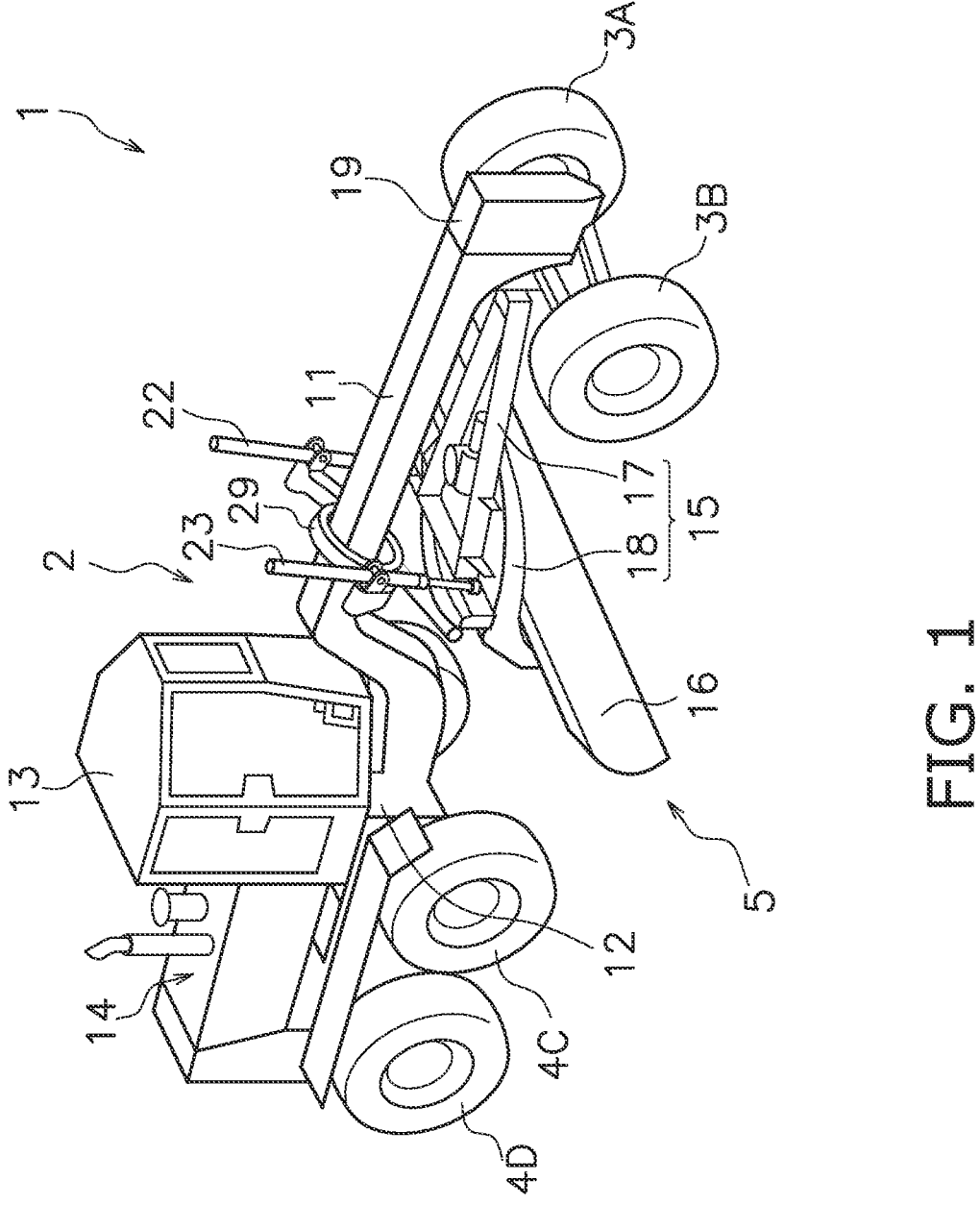
FIG. 1 is a perspective view of a work machine according to an embodiment.
Figure 2:
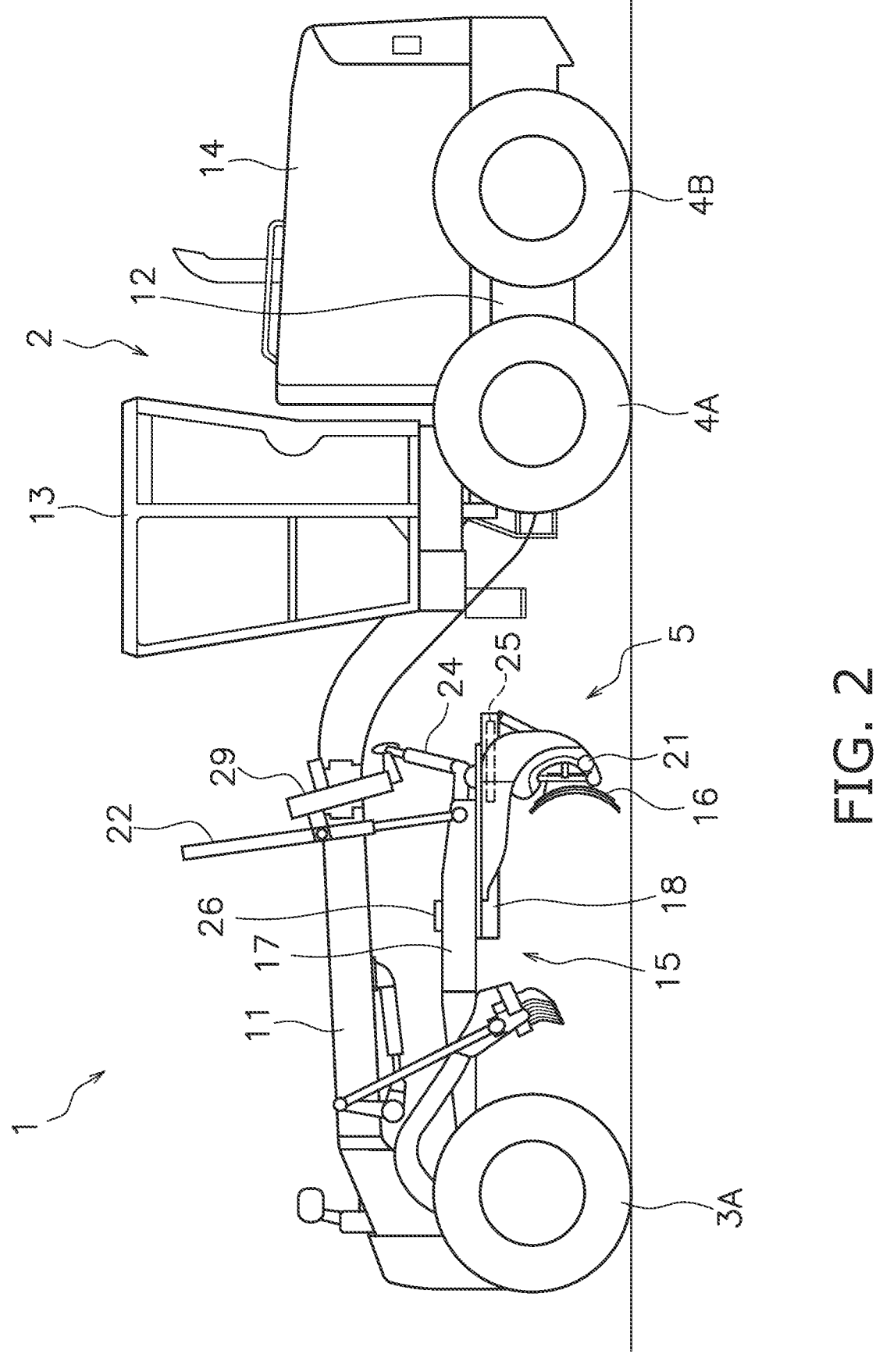
FIG. 2 is a side view of the work machine.

An embodiment of the present invention will be described below with reference to the drawings. FIG. 1 is a perspective view of a work machine 1 according to the embodiment. FIG. 2 is a side view of the work machine 1. As illustrated in FIG. 1, the work machine 1 includes a vehicle body 2, front wheels 3A and 3B, rear wheels 4A to 4D, and a work implement 5. The vehicle body 2 includes a front frame 11, a rear frame, 12, a cab 13, and a power chamber 14.

The rear frame 12 is connected to the front frame 11. The front frame 11 is able to articulate to the left and right with respect to the rear frame 12. In the following explanation, the front, rear, left, and right directions signify the front, rear, left, and right directions of the vehicle body 2 while the articulate angle is zero, that is while the front frame 11 and the rear frame 12 are straight.

The cab 13 and the power chamber 14 are disposed on the rear frame 12. An unillustrated operator's seat is disposed in the cab 13. The power chamber 14 is disposed behind the cab 13. The front frame 11 extends forward from the rear frame 12. The front wheels 3A and 3B are attached to the front frame 11. The rear wheels 4A to 4D are attached to the rear frame 12.

The work implement 5 is movably connected to the vehicle body 2. The work implement 5 includes a supporting member 15 and a blade 16. The supporting member 15 is movably connected to the vehicle body 2. The supporting member 15 supports the blade 16. The supporting member 15 includes a drawbar 17 and a circle 18. The drawbar 17 is disposed below the front frame 11.

The drawbar 17 is connected to a front part 19 of the front frame 11. The drawbar 17 extends rearward from the front part 19 of the front frame 11. The drawbar 17 is swingably supported at least in the up-down direction and the left-right direction of the vehicle body 2 with respect to the front frame 11. For example, the front part 19 includes a ball joint. The drawbar 17 is rotatably connected to the front frame 11 via the ball joint.

The circle 18 is connected to a rear part of the drawbar 17. The circle 18 is rotatably supported with respect to the drawbar 17. The blade 16 is connected to the circle 18. The blade 16 is supported by the drawbar 17 via the circle 18. As illustrated in FIG. 2, the blade 16 is supported by the circle 18 so as to be rotatable about a tilt shaft 21. The tilt shaft 21 extends in the left-right direction.

The work machine 1 includes a plurality of actuators 22 to 26 for changing the orientation of the work implement 5. The plurality of actuators 22 to 26 include a plurality of hydraulic cylinders 22 to 25. The plurality of hydraulic cylinders 22 to 25 are connected to the work implement 5. The plurality of hydraulic cylinders 22 to 25 extend and contract due to hydraulic pressure. The plurality of hydraulic cylinders 22 to 25 change the orientation of the work implement 5 with respect to the vehicle body 2 by extending and contracting. In the following explanation, the extension and contraction of the hydraulic cylinders is referred to as a "stroke motion."

Specifically, the plurality of hydraulic cylinders 22 to 25 include a left lift cylinder 22, a right lift cylinder 23, a drawbar shift cylinder 24, and a blade tilt cylinder 25. The left lift cylinder 22 and the right lift cylinder 23 are disposed away from each other in the left-right direction. The left lift cylinder 22 and the right lift cylinder 23 are connected to the drawbar 17. The left lift cylinder 22 and the right lift cylinder 23 are connected to the front frame 11 via a lifter bracket 29. The drawbar 17 swings up and down due to the stroke motions of the left lift cylinder 22 and the right lift cylinder 23. As a result, the blade 16 moves up and down.

The drawbar shift cylinder 24 is connected to the drawbar 17 and the front frame 11. The drawbar shift cylinder 24 is connected to the front frame 11 via the lifter bracket 29. The drawbar shift cylinder 24 extends diagonally downward from the front frame 11 toward the drawbar 17. The drawbar 17 swings left and right due to the stroke motions of the drawbar shift cylinder 24. The blade tilt cylinder 25 is connected to the circle 18 and the blade 16. The blade 16 rotates about the tilt shaft 21 due to the stroke motions of the blade tilt cylinder 25.

The plurality of actuators 22 to 26 include a rotation actuator 26. The rotation actuator 26 is connected to the drawbar 17 and the circle 18. The rotation actuator 26 causes the circle 18 to rotate with respect to the drawbar 17. Consequently, the blade 16 rotates about a rotating axis that extends in the up-down direction.

Figure 3:
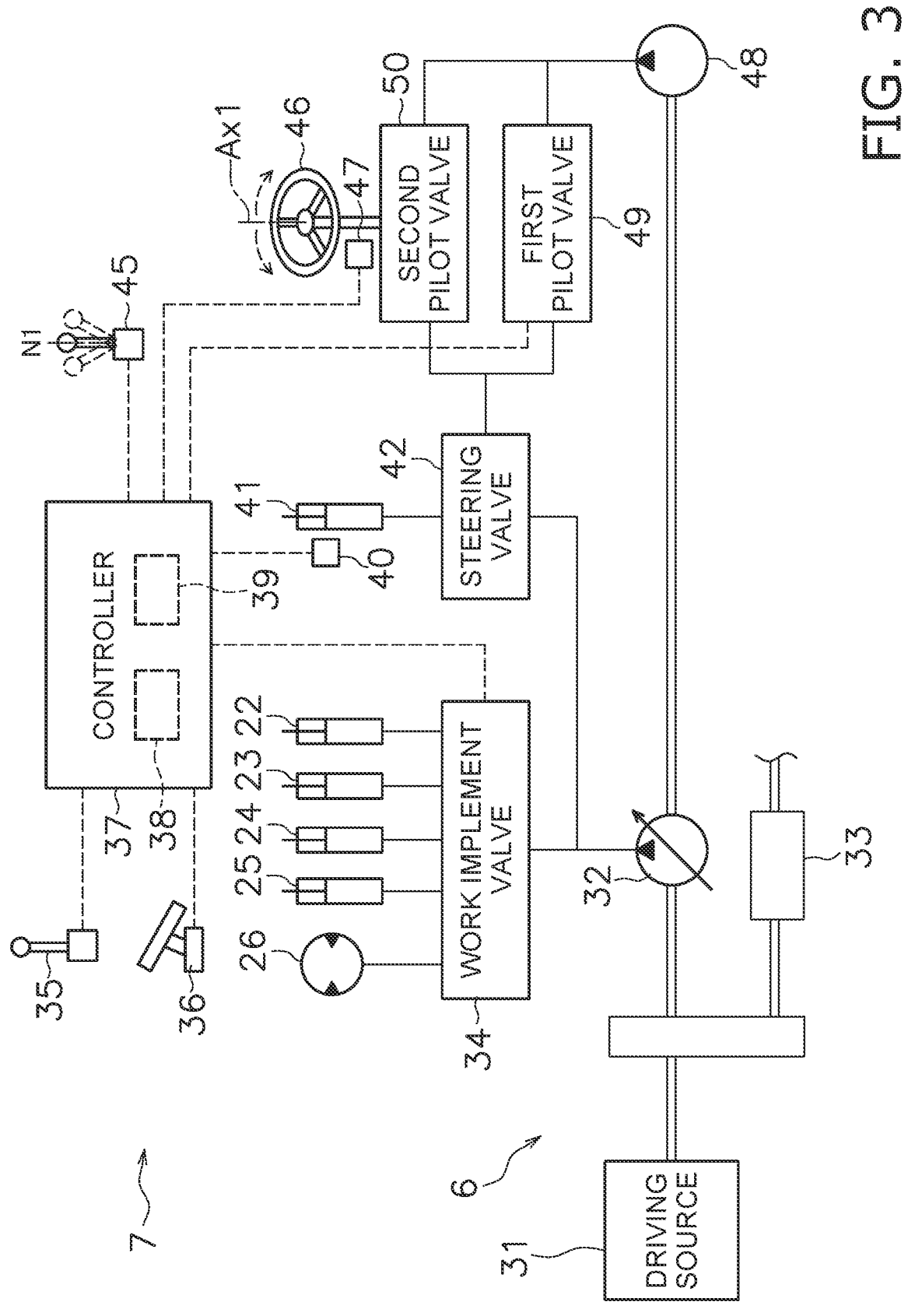
FIG. 3 is a schematic view of a configuration of the work machine.

FIG. 3 is a schematic view of a configuration of the work machine 1. As illustrated in FIG. 3, the work machine 1 includes a driving source 31, a first hydraulic pump 32, a power transmission device 33, and a work implement valve 34. The driving source 31 is, for example, an internal combustion engine. Alternatively, the driving source 31 may be an electric motor or a hybrid of an internal combustion engine and an electric motor. The first hydraulic pump 32 is driven by the driving source 31 thereby discharging hydraulic fluid.

The control valve 34 is connected to the first hydraulic pump 32 and the plurality of hydraulic cylinders 22 to 25 via a hydraulic circuit. The control valve 34 includes a plurality of valves connected to each of the plurality of hydraulic cylinders 22 to 25. The control valve 34 controls the flow rate of the hydraulic fluid supplied from the first hydraulic pump 32 to the plurality of hydraulic cylinder 22 to 25. The work implement valve 34 is, for example, an electromagnetic proportional control valve. Alternatively, the work implement valve 34 may be a hydraulic pilot-type proportional control valve.

In the present embodiment, the rotation actuator 26 is a hydraulic motor. The work implement valve 34 is connected to the first hydraulic pump 32 and the rotation actuator 26 via the hydraulic circuit. The work implement control valve 34 controls the flow rate of hydraulic fluid supplied from the first hydraulic pump 32 to the rotation actuator 26. The rotation actuator 26 may be an electric motor.

The power transmission device 33 transmits the driving power from the driving source 31 to the rear wheels 4A to 4D. The power transmission device 33 may include a torque converter and/or a plurality of speed change gears. Alternatively, the power transmission device 33 may be transmission of another type such as a hydrostatic transmission (HST) or a hydraulic mechanical transmission (HMT).

The work machine 1 includes a work implement operating member 35, an accelerator operating member 36, and a controller 37. The work implement operating member 35 is operable by an operator in order to change the orientation of the work implement 5. The work implement operating member 35 includes, for example, a plurality of operating levers. Alternatively, the work implement operating member 35 may be another member such as a switch or a touch screen. The work implement operating member 35 outputs signals indicating the operations of the work implement operating member 35 by the operator.

The accelerator operating member 36 is operable by an operator for controlling the travel of the work machine 1. The accelerator operating member 36 includes, for example, an accelerator pedal. Alternatively, the accelerator operating member 36 may be another member such as a switch or a touch screen. The accelerator operating member 36 outputs signals indicating the operations of the accelerator operating member 36 by the operator.

The controller 37 causes the work machine 1 to travel by controlling the driving source 31 and the power transmission device 33 in response to an operation on the accelerator operating member 36. The controller 37 also actuates the work implement 5 by controlling the first hydraulic pump 32 and the work implement valve 34 in response to an operation on the work implement operating member 35.

The controller 37 includes a storage device 38 and a processor 39. The processor 39 is, for example, a CPU and executes a program for controlling the work machine 1. The storage device 38 includes a memory such as a RAM or a ROM, and an auxiliary storage device such as an SSD or an HDD. The storage device 38 stores programs and data for controlling the work machine 1.

As illustrated in FIG. 3, the work machine 1 includes a steering angle sensor 40, a steering actuator 41, and a steering valve 42. The steering actuator 41 is a hydraulic cylinder. The steering actuator 41 extends and contracts with hydraulic fluid from the first hydraulic pump 32. The steering actuator 41 steers the front wheels 3A and 3B by extending and contracting.

Figure 4:
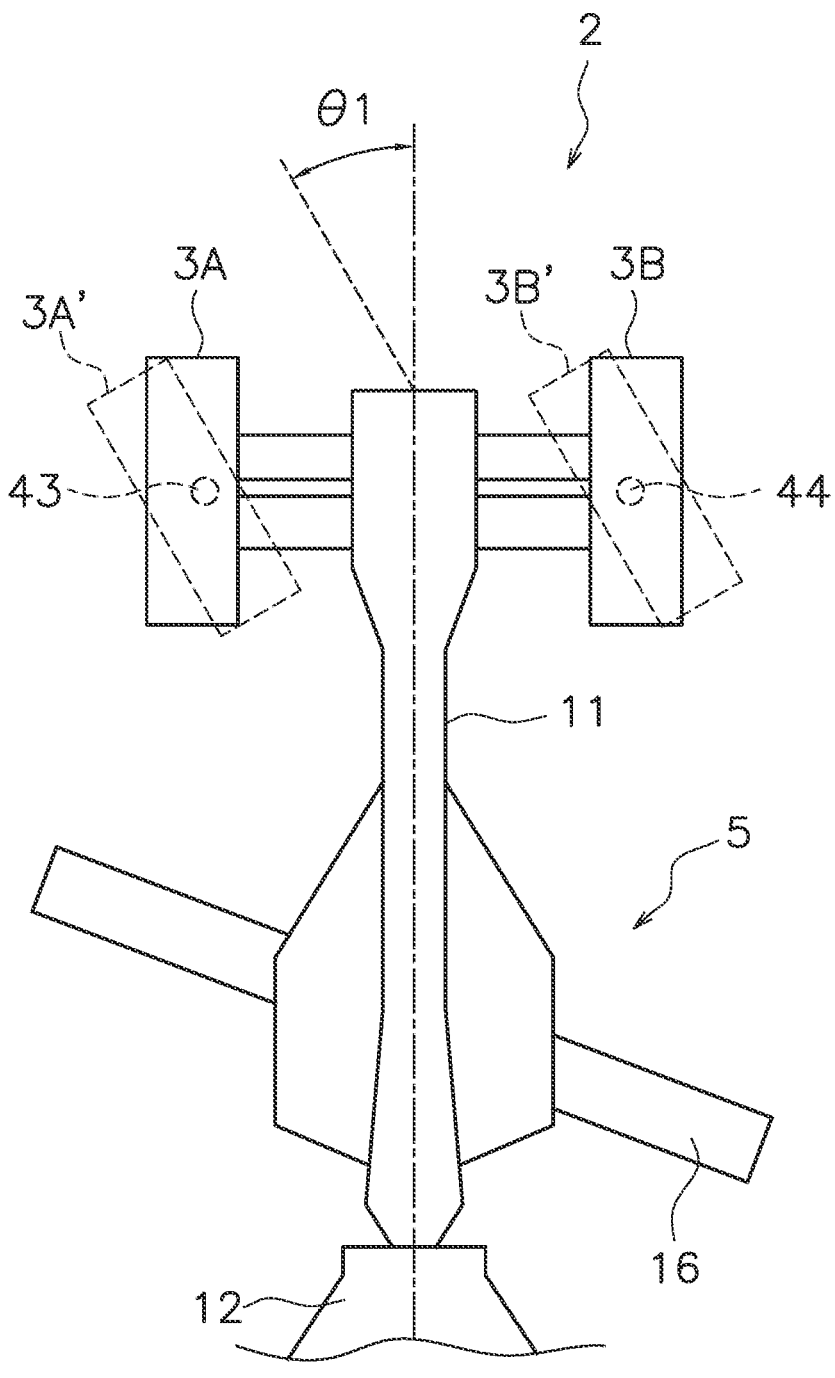
FIG. 4 is a top view of a front part of the work machine.

FIG. 4 is a top view of a front part of the work machine 1. As illustrated in FIG. 4, the front wheels 3A and 3B include a first front wheel 3A and a second front wheel 3B. The first front wheel 3 and the second front wheel 3B are disposed away from each other in the left-right direction. The first front wheel 3A is supported by the front frame 11 so as to be rotatable about a first steering shaft 43. The second front wheel 3B is supported by the front frame 11 so as to be rotatable about a second steering shaft 44. The first steering shaft 43 and the second steering shaft 44 extend in the up-down direction.

The steering actuator 41 is connected to the front wheels 3A and 3B and the front frame 11. The steering actuator 41 changes a steering angle θ1 of the front wheels 3A and 3B from a predetermined neutral angle to the left or right. As illustrated in FIG. 4, the steering angle θ1 is the angle that the front wheels 3A and 3B face with respect to the front-back direction of the work machine 1. The front-back direction of the work machine 1 signifies the front-back direction of the front frame 11. However, the front-back direction of the work machine 1 may also signify the front-back direction of the rear frame 12.

The neutral angle is a steering angle θ1 of zero degrees. Therefore, when the steering angle θ1 is the neutral angle, the front wheels 3A and 3B are facing straight forward of the work machine 1. In FIG. 4, 3A' indicates the first front wheel 3 that has been steered from the neutral angle to the left by the steering angle θ1. 3B' indicates the second front wheel 3B that has been steered from the neutral angle to the left by the steering angle θ1.

The steering valve 42 is connected through the hydraulic circuit to the first hydraulic pump 32 and the steering actuator 41. The steering valve 42 controls the flow rate of hydraulic fluid supplied from the first hydraulic pump 32 to the steering actuator 41. The steering valve 42 is, for example, a hydraulic pilot type of control valve.

The steering angle sensor 40 detects the steering angle θ1. The steering angle sensor 40 outputs an angle signal indicating the steering angle θ1. The steering angle sensor 40 detects, for example, the stroke amount of the steering actuator 41. The steering angle θ1 is calculated from the stroke amount of the steering actuator 41. Alternatively, the steering angle sensor 40 may detect the steering angle θ1 directly.

The work machine 1 includes a first steering member 45 and a second steering member 46. The first steering member 45 and the second steering member 46 is operable by the operator for changing the steering angle θ1 of the front wheels 3A and 3B to the left or right. The first steering member 45 is a lever such as a joy stick. Alternatively, the first steering member 45 may also be a member other than a lever. The first steering member 45 can be tilted to the left and right from a neutral position N1. The first steering member 45 outputs a first operation signal that indicates an operation on the first steering member 45 by the operator.

The second steering member 46 is a steering wheel. Alternatively, the second steering member 46 may be a member other than a steering wheel. The second steering member 46 is rotatable about a rotation axis Ax1. An operation sensor 47 is attached to the second steering member 46. The operation sensor 47 outputs a second operation signal that indicates an operation on the second steering member 46 by the operator. The operation sensor 47 detects, for example, the angular displacement about the rotation axis Ax1 of the second steering member 46.

The work machine 1 includes a second hydraulic pump 48, a first pilot valve 49, and a second pilot valve 50. The second hydraulic pump 48 is driven by the driving source 31 thereby discharging hydraulic fluid. The first pilot valve 49 is connected through the hydraulic circuit to the second hydraulic pump 48 and the steering valve 42. The first pilot valve 49 controls the pressure of the hydraulic fluid supplied from the second hydraulic pump 48 to the pilot port of the steering valve 42. The first pilot valve 49 is an electromagnetic proportional control valve.

The first pilot valve 49 is controlled by signals from the controller 37. The controller 37 controls the first pilot valve 49 in response to the first operation signals from the first steering member 45, thereby extending and contracting the steering actuator 41. Consequently, the controller 37 controls the steering actuator 41 so as to change the steering angle θ1 of the front wheels 3A and 3B in response to the operation of the first steering member 45. The control of the steering angle θ1 by means of the first steering member 45 is discussed in detail below.

The second pilot valve 50 is connected through the hydraulic circuit to the second hydraulic pump 48 and the steering valve 42. The second pilot valve 50 is connected to the second steering member 46. The second pilot valve 50 controls the pressure of the hydraulic fluid supplied from the second hydraulic pump 48 to the pilot port of the steering valve 42 in response to the operation of the second steering member 46. Consequently, the steering actuator 41 changes the steering angle θ1 of the front wheels 3A and 3B so that the steering angle θ1 of the front wheels 3A and 3B becomes the angle corresponding to the operating amount of the second steering member 46.

When the operating amount of the second steering member 46 is held in a constant manner, the steering actuator 41 holds the steering angle θ1 of the front wheels 3A and 3B at the angle corresponding to the operating amount of the second steering member 46. The second pilot valve 50 may also be an electromagnetic proportional control valve, similar to the first pilot valve 49. In this case, the controller 37 may control the second pilot valve 50 in response to the operation of the second steering member 46.

Next, the control of the steering angle θ1 by means of the first steering member 45 is discussed. The controller 37 acquires the operating amount of the first steering member 45 from the first operation signal from the first steering member 45. The controller 37 acquires the current steering angle θ1 from a signal from the steering angle sensor 40. The controller 37 refers to steering speed data and determines a target steering speed from the operating amount of the first steering member 45. The controller 37 controls the steering actuator 41 so that the steering angle θ1 changes at the target steering speed. The steering speed data prescribes the target steering speed with respect to the operating amount of the first steering member 45.

Figure 5:
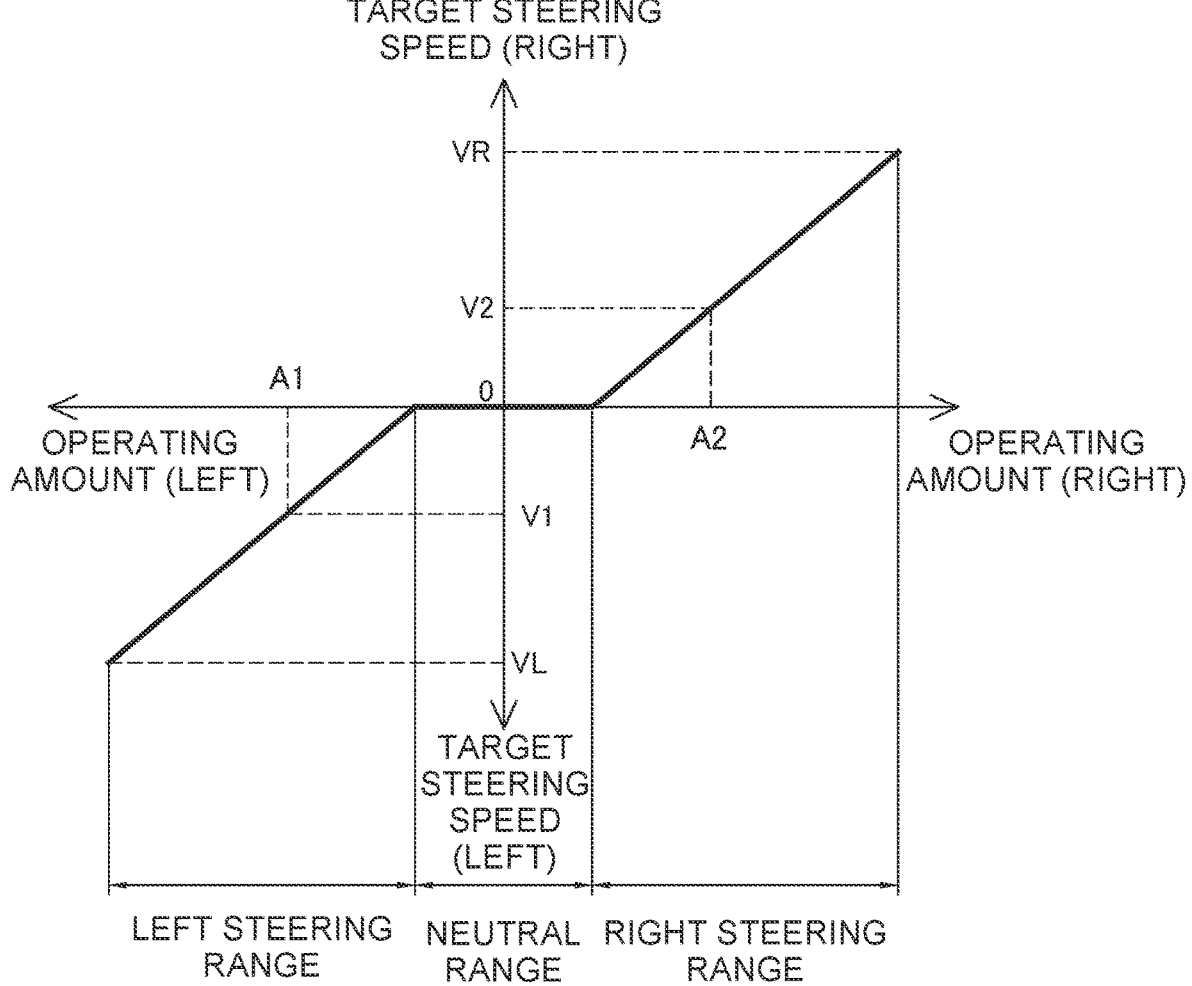
FIG. 5 illustrates an example of steering speed data.

FIG. 5 illustrates an example of the steering speed data. As illustrated in FIG. 5, the first steering member 45 is operable within a neutral range, a left steering range, and a right steering range. The neutral range is a range that includes the position of the first steering member 45 at the operating amount 0, that is the range includes the neutral position N1. The neutral range is positioned between the left steering range and the right steering range. The left steering range is positioned to the left of the neutral range. The right steering range is positioned to the right of the neutral range.

The steering speed data prescribes the target steering speed to the left that increases from 0 to the maximum speed VL to the left in response to an increase in the operating amount to the left of the first steering member 45 within the left steering range. Therefore, the controller 37 controls the steering actuator 41 so as to change the steering angle θ1 of the front wheels 3A and 3B to the left at a speed that corresponds to the operating amount of the first steering member 45 when the first steering member 45 is positioned in the left steering range.

For example, when the first steering member 45 is operated by an operating amount A1 to the left, the controller 37 determines a steering speed V1 corresponding to the operating amount A1 as the target steering speed. The controller 37 then controls the steering actuator 41 so as to change the steering angle θ1 of the front wheels 3A and 3B to the left at the steering speed V1. Additionally, the steering angle θ1 of the front wheels 3A and 3B continues to change to the left at the steering speed V1 until reaching the maximum steering angle to the left while the first steering member 45 is held at the operating amount A1 to the left.

The steering speed data prescribes the target steering speed to the right that increases from 0 to the maximum speed VR to the right in response to an increase in the operating amount to the right of the first steering member 45 within the right steering range. Therefore, the controller 37 controls the steering actuator 41 so as to change the steering angle θ1 of the front wheels 3A and 3B to the right at a speed that corresponds to the operating amount of the first steering member 45 when the first steering member 45 is positioned in the right steering range.

For example, when the first steering member 45 is operated by an operating amount A2 to the right, the controller 37 determines a steering speed V2 corresponding to the operating amount A2 as the target steering speed. The controller 37 then controls the steering actuator 41 so as to change the steering angle θ1 of the front wheels 3A and 3B to the right at the steering speed V2. Additionally, the steering angle θ1 of the front wheels 3A and 3B continues to change to the right at the steering speed V2 until reaching the maximum steering angle to the right while the first steering member 45 is held at the operating amount A2 to the right.

The controller 37 controls the steering actuator 41 so that when the first steering member 45 is positioned in the neutral range, the steering angle θ1 is held at the neutral angle. For example, when the first steering member 45 is positioned in the neutral range while the steering angle θ1 is the neutral angle, the steering angle θ1 is not changed and is held at the neutral angle.

When the first steering member 45 is positioned in the neutral range but the steering angle θ1 is not the neutral angle, the controller 37 controls the steering actuator 41 in an auto-mode for automatically returning the steering angle θ1 to the neutral angle.

For example, when the steering angle θ1 is a predetermined angle to the left and the first steering member 45 is returned to the neutral range, the controller 37 controls the steering actuator 41 so that the steering angle θ1 returns from the predetermined angle to the left to the neutral angle. When the steering angle θ1 is a predetermined angle to the right and the first steering member 45 is returned to the neutral range, the controller 37 controls the steering actuator 41 so that the steering angle θ1 returns from the predetermined angle to the right to the neutral angle.

When the first steering member 45 and the second steering member 46 are operated at the same time, the controller 37 prioritizes the operation of the second steering member 46. Therefore, when the first steering member 45 and the second steering member 46 are operated at the same time, the controller 37 does not perform the abovementioned control of the steering angle θ1 through the first steering member 45. As a result, the steering angle θ1 changes in response to the operation of the second steering member 46.

Figure 6:
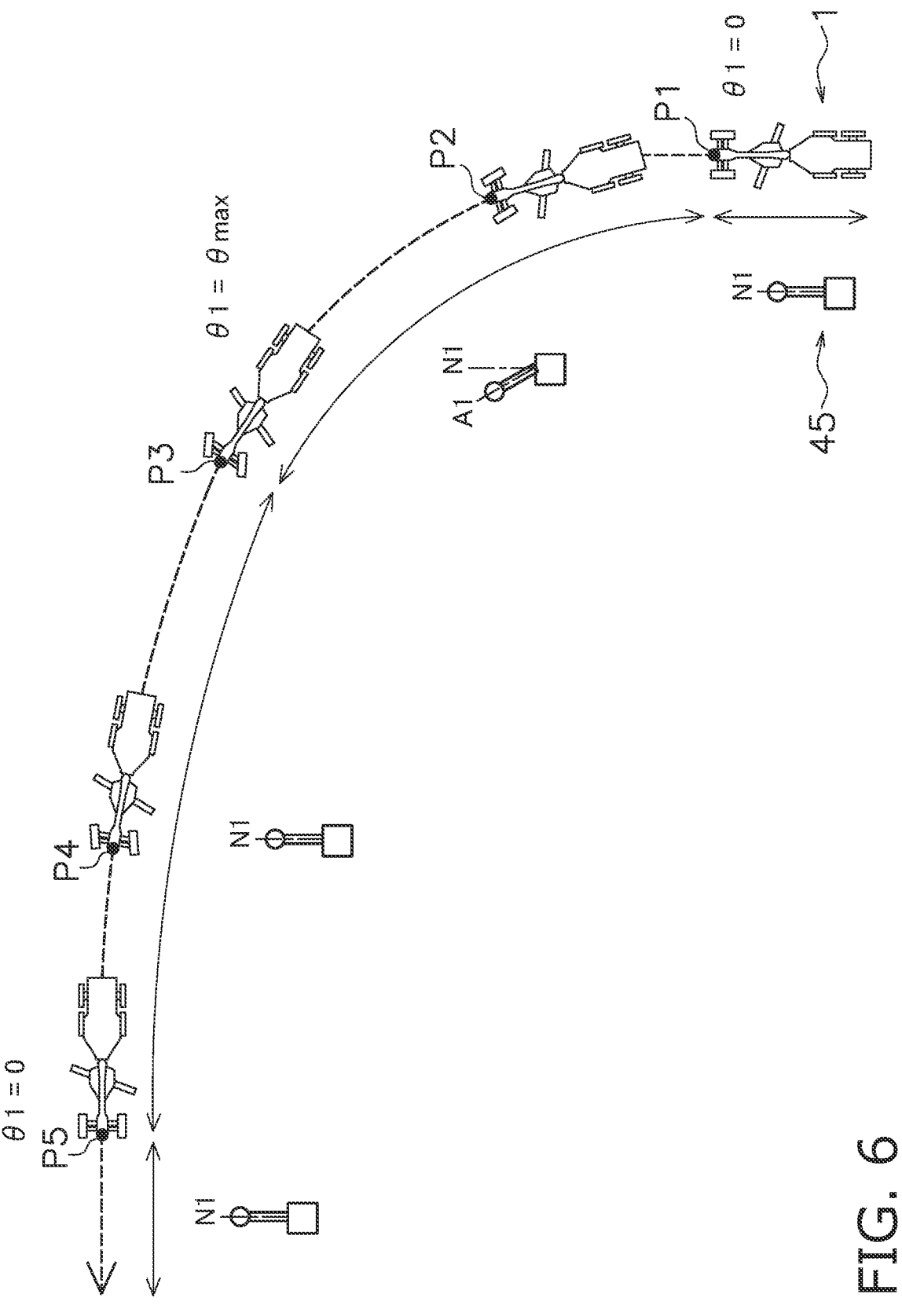
FIG. 6 illustrates an example of travel of the work machine due to an operation on a first steering member.

FIG. 6 illustrates an example of travel of the work machine 1 due to an operation on the first steering member 45. As illustrated in FIG. 6, the first steering member 45 is positioned at the neutral position N1 while the work machine 1 is at the point P1. The steering angle θ1 is the neutral angle and the work machine 1 travels straight forward. At the point P2, the steering angle θ1 of the front wheels 3A and 3B begins to change from the neutral angle to the left when the operator operates the first steering member 45 by the operating amount A1 within the left steering range. Consequently, the work machine 1 turns to the left.

When the operator holds the first steering member 45 at the operating amount A1 between the point P2 and the point P3, the steering angle θ1 of the front wheels 3A and 3B continues to increase up to the maximum steering angle θmax to the left. Consequently, the work machine 1 continues to turn to the left. When the operator returns the first steering member 45 to the neutral range at the point P3, the steering angle θ1 of the front wheels 3A and 3B decreases from the maximum steering angle θmax toward the neutral angle due to the auto-mode. At the point P5, the steering angle θ1 of the front wheels 3A and 3B then returns to the neutral angle. Consequently, the work machine 1 travels straight.

According to the work machine 1 of the present embodiment, the steering angle θ1 is controlled at a speed control type when the first steering member 45 is operated in the left steering range or the right steering range. Consequently, an operation of a very small steering angle θ1 can be performed smoothly. In addition, when the first steering member 45 is positioned in the neutral range, the steering angle θ1 is returned to the neutral angle. As a result, the operator is able to cause the work machine 1 to travel straight easily by returning the first steering member 45 to the neutral range after turning the work machine 1.

Although an embodiment of the present invention has been described so far, the present invention is not limited to the above embodiment and various modifications may be made within the scope of the invention.

The work machine 1 is not limited to a motor grader and may be another work machine such as a wheel loader, a dump truck, or a forklift. The number of the steering actuator 41 is not limited to one and may be two or more. The steering actuator 41 is not limited to a hydraulic cylinder and may be a hydraulic motor or an electric motor.

Figure 7:
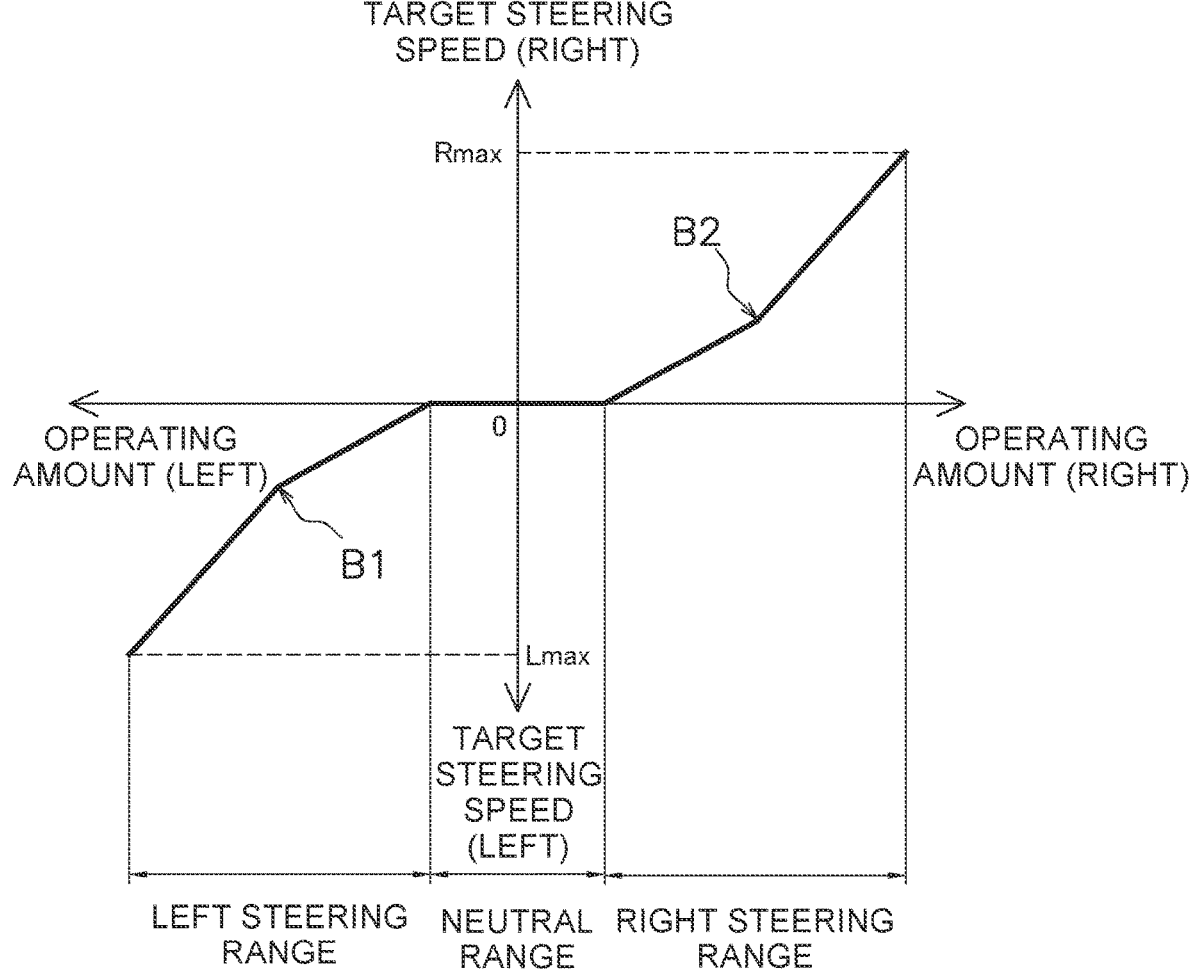
FIG. 7 illustrates steering speed data according to a first modified example.

The steering speed data is not limited to the above embodiment and may be changed. For example, FIG. 7 illustrates steering speed data according to a first modified example. As illustrated in FIG. 7, the steering speed data may have inflection points B1 and B2 within the left steering range and the right steering range. That is, within the left steering range, the rate of increase of the target steering speed to the left with respect to the operating amount to the left may change at the inflection point B1. Within the right steering range, the rate of increase of the target steering speed to the right with respect to the operating amount to the right may change at the inflection point B2.

Figure 8:
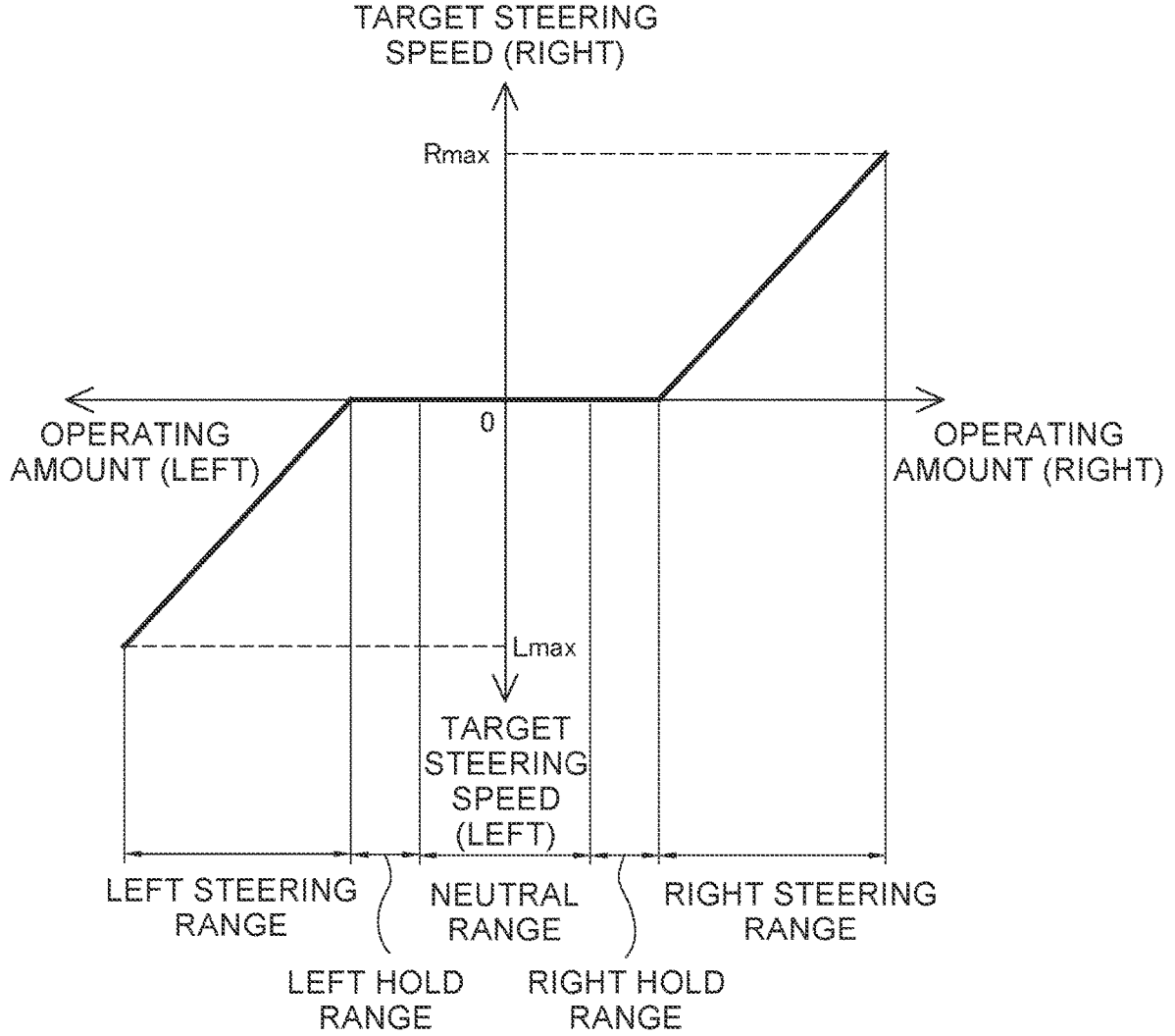
FIG. 8 illustrates steering speed data according to a second modified example.

FIG. 8 illustrates steering speed data according to a second modified example. As illustrated in FIG. 8, the first steering member 45 may be operable in a left hold range and a right hold range. The left hold range is a position between the neutral range and the left steering range. The right hold range is a position between the neutral range and the right steering range.

When the first steering member 45 is positioned in the left hold range, the controller 37 may control the actuator so as to hold the steering angle θ1 of the front wheels 3A and 3B at the current angle. For example, when the steering angle θ1 of the front wheels 3A and 3B is at a predetermined angle to the left and the operator operates the first steering member 45 from the left steering range to the left hold range, the controller 37 holds the steering angle θ1 of the front wheels 3A and 3B at the predetermined angle to the left. When the operator returns the first steering member 45 from the left hold range to the neutral range, the controller 37 controls the steering actuator 41 so as to change the steering angle θ1 of the front wheels 3A and 3B from the predetermined angle to the left to the neutral angle.

When the first steering member 45 is positioned in the right hold range, the controller 37 may control the actuator so as to hold the steering angle θ1 of the front wheels 3A and 3B at the current angle. For example, when the steering angle θ1 of the front wheels 3A and 3B is at a predetermined angle to the right and the operator operates the first steering member 45 from the right steering range to the right hold range, the controller 37 holds the steering angle θ1 of the front wheels 3A and 3B at the predetermined angle to the right. When the operator returns the first steering member 45 from the right hold range to the neutral range, the controller 37 controls the steering actuator 41 so as to change the steering angle θ1 of the front wheels 3A and 3B from the predetermined angle to the right to the neutral angle.

According to the present invention, there is provided a work machine with which an operation for performing a very small turn can be performed smoothly and operations for turning and traveling straight are easy.

The invention claimed is:

1. A work machine comprising:
   a vehicle body;

a traveling wheel supported by the vehicle body;

an actuator configured to change a steering angle of the traveling wheel from a neutral angle to left or right;

a first steering member that is operable between a left steering range, a right steering range, and a neutral range between the left steering range and the right steering range; and a controller configured to
   control the actuator so that the steering angle of the traveling wheel is changed to the left at a speed that corresponds to an operating amount of the first steering member when the first steering member is positioned in the left steering range,
   control the actuator so that the steering angle of the traveling wheel is changed to the right at a speed that corresponds to the operating amount of the first steering member when the first steering member is positioned in the right steering range,
   control the actuator so that the steering angle returns to the neutral angle when the first steering member is positioned in the neutral range, and
   control the actuator so that the steering angle of the traveling wheel is held at a current angle when the first steering member is positioned in a left hold range, the first steering member being operable in the left hold range between the neutral range and the left steering range.

2. The work machine according to claim 1, wherein
   the first steering member is operable in a right hold range between the neutral range and the right steering range, and
   the controller is configured to control the actuator so that the steering angle of the traveling wheel is held at a current angle when the first steering member is positioned in the right hold range.

3. The work machine according to claim 1, further comprising:
   a second steering member that is operable to the left or right from a neutral position, wherein
   the actuator being configured to change changes the steering angle of the traveling wheel so that the steering angle of the traveling wheel becomes an angle corresponding to an operating amount of the second steering member.

4. The work machine according to claim 3, wherein
   the controller is configured to prioritize an operation of the second steering member over an operation of the first steering member to change the steering angle of the traveling wheel.

5. A method for controlling a work machine that includes a vehicle body, a traveling wheel that is supported by the vehicle body, and an actuator configured to change a steering angle of the traveling wheel from a neutral angle to left or right, the method comprising:
   acquiring a signal indicating an operating amount of a first steering member that is operable between a left steering range, a right steering range, and a neutral range between the left steering range and the right steering range;
   controlling the actuator so that the steering angle of the traveling wheel is changed to the left at a speed that corresponds to the operating amount of the first steering member when the first steering member is positioned in the left steering range;
   controlling the actuator so that the steering angle of the traveling wheel is changed to the right at a speed that corresponds to the operating amount of the first steering member when the first steering member is positioned in the right steering range;

controlling the actuator so that the steering angle returns to the neutral angle when the first steering member is positioned in the neutral range; and controlling the actuator so that the steering angle of the traveling wheel is held at a current angle when the first steering member is positioned in a left hold range, the first steering member being operable in the left hold range between the neutral range and the left steering range.

6. The method according to claim 5, wherein the first steering member is operable in a right hold range between the neutral range and the right steering range, and the method further comprises controlling the actuator so that the steering angle of the traveling wheel is held at a current angle when the first steering member is positioned in the right hold range.

7. The method according to claim 5, further comprising:

receiving a signal that indicates an operating amount of a second steering member that is operable to the left or right from a neutral position, the actuator changing the steering angle of the traveling wheel so that the steering angle of the traveling wheel becomes an angle corresponding to the operating amount of the second steering member.

8. The method according to claim 7, further comprising:

prioritizing an operation of the second steering member over an operation of the first steering member to change the steering angle of the traveling wheel.

\* \* \* \* \*